(12) United States Patent
So (10) Patent No.: US 6,752,293 B2
(45) Date of Patent: Jun. 22, 2004

(54) COOKIE DOUGH DISPENSER (76) Inventor: Kwok Kuen So, 2nd Floor, Chuan Yuan Factory Building, 342-344 Kwun Tong Road, Kwun Tong, Kowloon (HK)

(*) Notice: Subject to any disclaimer, the term of this patent is extended or adjusted under 35 U.S.C. 154(b) by 106 days.

(21) Appl. No.: 09/986,010

(22) Filed: Nov. 7, 2001

(65) Prior Publication Data
US 2002/0179645 A1 Dec. 5, 2002

Related U.S. Application Data (63) Continuation-in-part of application No. 09/866,850, filed on May 30, 2001.

(51) Int. Cl.$^7$ ................................................ B67D 5/38
(52) U.S. Cl. ...................................... 222/156; 222/326
(58) Field of Search ........................... 222/153.01, 156, 222/158, 326

(56) References Cited

U.S. PATENT DOCUMENTS

| | | | | |
|---|---|---|---|---|
| 2,604,858 A | * | 7/1952 | Bosa | 425/288 |
| 2,626,731 A | * | 1/1953 | Ekins | 222/470 |
| 3,185,345 A | * | 5/1965 | Hunegs | 222/45 |
| 4,106,534 A | | 8/1978 | Johnson | |
| 4,572,725 A | | 2/1986 | Kojima | |
| 4,793,521 A | * | 12/1988 | Steiner | 222/156 |
| 4,848,598 A | * | 7/1989 | McKinney | 222/391 |
| 4,948,016 A | * | 8/1990 | Summons et al. | 222/158 |
| 4,966,537 A | * | 10/1990 | Bowles et al. | 425/87 |
| 5,733,258 A | * | 3/1998 | Lane | 604/506 |
| 5,860,566 A | * | 1/1999 | Lucs | 222/1 |
| 5,875,920 A | * | 3/1999 | Parent | 222/1 |
| 6,026,985 A | | 2/2000 | Elliott, Sr. | |

FOREIGN PATENT DOCUMENTS

| | | | | |
|---|---|---|---|---|
| EP | 0508168 A1 | * | 10/1992 | ........... B65D/35/08 |
| GB | 2 076 473 A | | 12/1981 | |
| JP | 405042979 A | * | 2/1993 | ................. 222/154 |
| JP | 6-79746 | | 3/1994 | |
| JP | 8-113253 | | 5/1996 | |
| JP | 11-13989 | | 1/1999 | |
| SU | 1797011 A1 | | 2/1993 | |

* cited by examiner

Primary Examiner—Gene Mancene
Assistant Examiner—Melvin A. Cartagena
(74) Attorney, Agent, or Firm—Leydig, Voit & Mayer, Ltd.

(57) ABSTRACT

A cookie dough dispenser in the form of a cookie gun includes a barrel having opposite first and second ends for containing cookie dough, a handgrip provided at the first end, an exit formed at the second end for dispensing cookie dough contained in the barrel, and a cookie dough dispensing mechanism. The dispensing mechanism includes a trigger at the handgrip and a piston slidable within and along the axis of the barrel to dispense cookie dough from the barrel through the exit. The barrel includes a metal outer cylinder and an inner plastic cylinder that is transparent or near-transparent, located co-axially within the outer cylinder, in contact with the outer cylinder. The outer cylinder includes a slot covered by an adjacent part of the inner cylinder as a lens, through which the piston is viewable.

13 Claims, 8 Drawing Sheets

COOKIE DOUGH DISPENSER

This disclosure is a continuation-in-part of U.S. patent application Ser. No. 09/866,850 filed May 30, 2001.

The present invention relates to a cookie dough dispenser that is particularly, but not exclusively, in the form of a so-called cookie gun.

BACKGROUND OF THE INVENTION

Cookie dough dispensers are commonplace, which typically include a barrel for containing cookie dough and a piston within the barrel slidable forwards to press cookie dough contained therein out through a front nozzle or opening of the barrel. The barrel may be made of a transparent plastics material, or formed with a closed window, to reveal the position of the piston that in turn indicates the amount of cookie dough left in the barrel. In the former case, plastics is in general not a robust and/or elegant-looking material. Also, the piston and some of the other internal components are visible through the barrel wall, which may not be desired. In the latter case, leakage through the edge of the window is a potential problem.

The invention seeks to mitigate or at least alleviate such shortcomings and problems by providing an improved cookie dough dispenser.

SUMMARY OF THE INVENTION

According to the invention, there is provided a cookie dough dispenser comprising a barrel having opposite first and second ends and for containing cookie dough, a handle provided at the first end, an exit at the second end for cookie dough contained in the barrel, and a cookie dough dispensing mechanism including an operating member at the handle and a piston slidable within and along the axis of the barrel to dispense cookie dough from the barrel through the exit. The barrel includes an outer cylinder made of metal and an inner cylinder made of transparent or near-transparent plastic material located co-axially with and within the outer cylinder. The outer cylinder has a slot that is closed by an adjacent integral part of the inner cylinder acting as a lens, through which slot and lens the piston is viewable.

Preferably, the inner cylinder covers substantially the entire inner surface of the outer cylinder.

It is preferred that the lens expands in thickness outwards to occupy substantially the entire volume of space defined by the slot.

More preferably, the lens lies flush with the slot on the outer surface of the outer cylinder.

More preferably, the lens expands outwards beyond the outer surface of the slot and then laterally to form a periphery that covers at least a substantial part of a rim of the slot, the lens along the periphery engaging part of the rim.

In a first preferred embodiment, the inner cylinder is moulded onto the inner surface of the outer cylinder.

More preferably, the slot has opposite closed ends.

More preferably, adjacent the first end of the barrel, the wall of the outer cylinder is deformed slightly outwards at equiangular positions at protrusions acting as screw threads for connecting the handle. The reverse side of the protrusions are indentations on the inner surface of the outer cylinder, which the material of the inner cylinder engages.

More preferably, adjacent the second end of the barrel, the wall of the outer cylinder is deformed slightly outwards at equiangular positions at protrusions acting as screw threads for connecting a member including the exit. The reverse side of the protrusions are indentations on the inner surface of the outer cylinder, which the material of the inner cylinder engages.

In a second preferred embodiment, the inner cylinder is moulded into shape independently and then subsequently inserted co-axially into the outer cylinder as a sliding snug fit.

More preferably, the slot has an open end and an opposite closed end.

More preferably, adjacent the first end of the barrel, the wall of the outer cylinder is deformed slightly outwards at equiangular positions to form protrusions acting as screw threads for connecting the handle.

More preferably, adjacent the second end of the barrel, the wall of the outer cylinder is deformed slightly outwards at equiangular protrusions providing screw threads for connecting a member including the exit.

It is preferred that the handle is in the form of a pistol handgrip and the operating member comprises a pull trigger.

In a specific construction, the dispensing mechanism includes a ratchet rack having one end supporting the piston for sliding along the barrel and a ratchet member operable by the operating member to advance the rack and hence the piston in a stepwise manner to dispense cookie dough.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
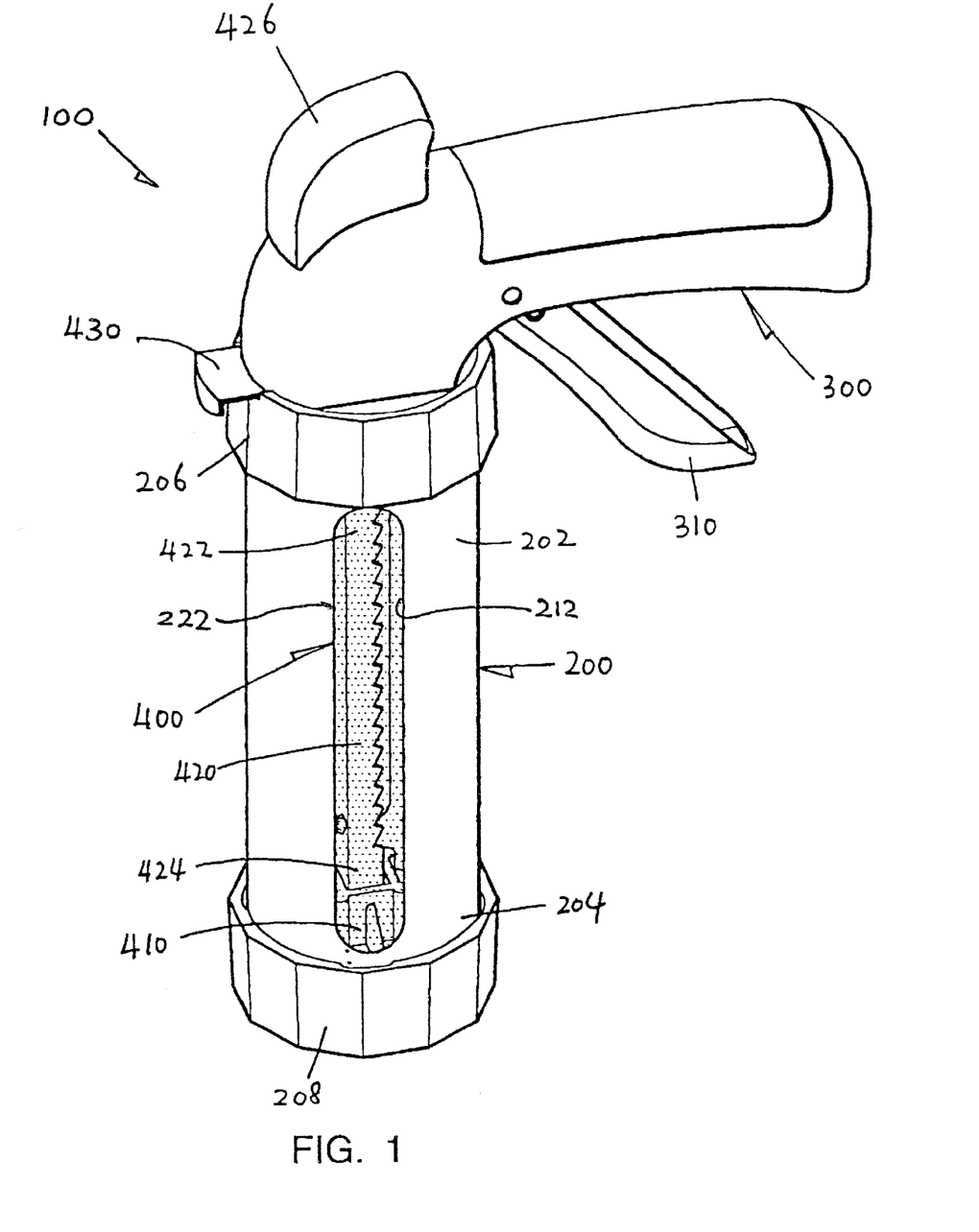
FIG. 1 is a perspective view of an embodiment of a cookie dough dispenser in accordance with the invention, said dispenser including a cylindrical barrel.

Referring initially to FIG. 1 of the drawings, there is shown a cookie dough dispenser in the form of a cookie gun 100 embodying the invention, which gun 100 comprises a cylindrical barrel 200 for containing cookie dough and a handle in the form of a pistol handgrip 300. The barrel 200 has upper and lower ends 202 and 204 that are closed by respective plastics annular end caps 206 and 208. Each end cap 206/208 is formed with internal screw-thread ribs for releasably fastening onto the respective barrel end 202/204.

The lower end cap 208 serves to locate a disc-like die (not shown) across the lower barrel end 204, which is apertured and acts as an exit (or a nozzle) for cookie dough in the barrel 200 to be dispensed. The apertures of such dies are in different designs to determine the cross-sectional shape of cookie dough dispensed and in turn the outer shape of the cookies to be made.

The handgrip 300 incorporates a pull trigger 310 and is integrally formed with the upper end cap 206 for in turn releasable connection to the upper barrel end 202. The pull trigger 310 is arranged to operate a cookie dough dispensing mechanism 400 of the cookie gun 100, which is provided within the barrel 200.

The cookie dough dispensing mechanism 400 is formed by a piston 410 slidable along the axis of the barrel 200, a shaft in the form of a ratchet rack 420 that extends co-axially within the barrel 200 and carries or supports the piston 410 for movement, a ratchet member in the form of a pawl (not shown) repeatedly pivotable by the pull trigger 310 to advance the shaft 420 and hence the piston 410 stepwise downwards, and a spring-loaded tab 430 retaining the shaft 420 against reverse movement. The piston 410 seals slidably with the inner surface of the barrel 200 and serves to press or squeeze, upon advance, cookie dough in the barrel 200 out through the die at the barrel lower end 204 onto a baking tray or the like for baking.

The ratchet rack 420 has upper and lower ends 422 and 424 and extends into the barrel 200 through the handgrip 300 and the upper end cap 206. The upper end 422 is fitted with an external knob 426, by means of which the shaft 420 may be pulled back from within the barrel 200. The lower end 424 supports the piston 410. Inside the handgrip 300, the rack 420 is acted upon by the aforesaid pawl to advance and is stopped by the tab 430 against moving back.

The tab 430 protrudes laterally out at a position between the handgrip 300 and the upper end cap 206. When the tab 430 is manually pulled outwards, the ratchet rack 420 (and the piston 410) is released and may then be pulled back by the knob 426. Subsequently, the lower end cap 208 with the die may be unscrewed to allow the barrel 200 to be replenished with cookie dough.

Reference is now made to FIGS. 2 to 8. The barrel 200 consists of an outer cylinder 210 that is made of metal preferably stainless steel, and an inner cylinder 220 that is made of transparent or near-transparent plastics material. The inner cylinder 220 is moulded co-axially onto the inner surface of the outer cylinder 210 through insert moulding operation. The outer cylinder 210 is formed with a straight closed-ended slot 212 extending longitudinally from adjacent one end 202/204 of the barrel 200 to near the other end 204/202.

Adjacent each end 202/204 of the barrel 200, the wall of the outer cylinder 210 is deformed slightly outwards at equiangular positions to form three protrusions in the form of ribs 214. The ribs 214 are inclined at a small angle to the cross-sectional plane of the cylinder 210 and act as screw threads for fastening the respective end cap 206/208.

The inner cylinder 220 is moulded to cover substantially the entire inner surface of the outer cylinder 210 including the slot 212, through which the wall of the inner cylinder 220 is exposed to form a lens 222. The position of the piston 410 and hence the amount of the cookie dough remaining inside the barrel 200 can be determined visually through the lens 222 as a window.

The lens 222 expands in thickness evenly outwards to occupy substantially the entire volume of space defined by the slot 212, such that the lens 222 lies flush with the slot 212 on the outer surface of the outer cylinder 210. This results in the outer surface of the barrel 200 across the lens 222 being smooth. It is envisaged that the lens 222 may be moulded to be gradually relatively thicker towards its central region to form a convex lens, such that the piston 410 and/or the cookie dough inside the barrel 200 can be seen more easily.

By reason of its formation through insert moulding, the inner cylinder 220 is inherently attached and secured to the outer cylinder 210, in ultimate surface contact therewith, against the ingress of liquid through the junction between the lens 222 and the slot 212 into the interface between the two cylinders 210 and 220. The engagement between the lens 222 and the slot 212 inherently prevents relative displacement between the two cylinders 210 and 220. The ribs 214 form indentations on the inner surface of the outer cylinder 210, with which the material of the inner cylinder 220 moulded into shape there engages, and this further reinforces the engagement between the two cylinders 210 and 220 especially at the upper and lower ends thereof.

Referring finally to FIGS. 9 to 13, there is shown an alternative cylindrical barrel 300 that the cookie dough dispenser 100 of FIG. 1 may incorporate instead of the aforesaid barrel 200. This barrel 300 consists of an outer cylinder 310 that is made of metal preferably stainless steel, and an inner cylinder 320 that is made of transparent or near-transparent plastics material. The inner cylinder 320 is moulded into shape independently and then subsequently inserted co-axially into the outer cylinder 310 as a sliding snug fit, in that the inner cylinder 320 has an outer diameter marginally smaller than the inner diameter of the outer cylinder 310 and their lengths are substantially the same.

The outer cylinder 310 is formed with a straight slot 312 extending longitudinally from an upper end 302 of the barrel 300 where the end of the slot 312 is open to near the lower end 304 where the end of the slot 312 is closed.

Adjacent each end 302/304 of the barrel 300, the wall of the outer cylinder 310 is deformed slightly outwards at equiangular positions to form three protrusions in the form of ribs 314. The ribs 314 are inclined at a small angle to the cross-sectional plane of the cylinder 310 and act as screw threads for fastening the respective end cap 206/208.

The inner cylinder 320 covers substantially the entire inner surface of the outer cylinder 310 including the slot 312, through which the wall of the inner cylinder 320 is thickened outwards to form a lens 322. The position of the piston 410 and hence the amount of the cookie dough remaining inside the barrel 300 can be determined visually through the lens 322 as a window.

The lens 322 expands in thickness outwards to occupy the entire volume of space defined by the slot 312, in that the outer surface of a short section 324 at the uppermost end of the lens 322 lies flush with the outer surface of the slot 312 to fit the upper end cap 206. Apart from this short section 324, the lens 322 expands outwards beyond the outer surface of the slot 312 and then laterally to form a periphery that covers a substantial part of the rim of the slot 312, except on opposite sides of the short section 324. This results in a construction in that, apart from the short section 324, the lens 322 along said periphery embraces the rim of the slot 312 in a sliding snug manner with a view to avoiding or minimising the ingress of liquid through the junction between the lens 322 and the slot 312 into the interface between the two cylinders 310 and 320.

The inner cylinder 320 is detachable from the outer cylinder 310, or vice versa, such that in the case that liquid does seep into the interface between the two cylinders 310 and 320 during use, the cylinders 310 and 320 can be separated apart and washed independently.

It is envisaged that the lens 322 may be made gradually relatively thicker towards its central region to form a convex lens, such that the piston 410 and/or the cookie dough inside the barrel 300 can be seen more easily.

Figures 2, 3:
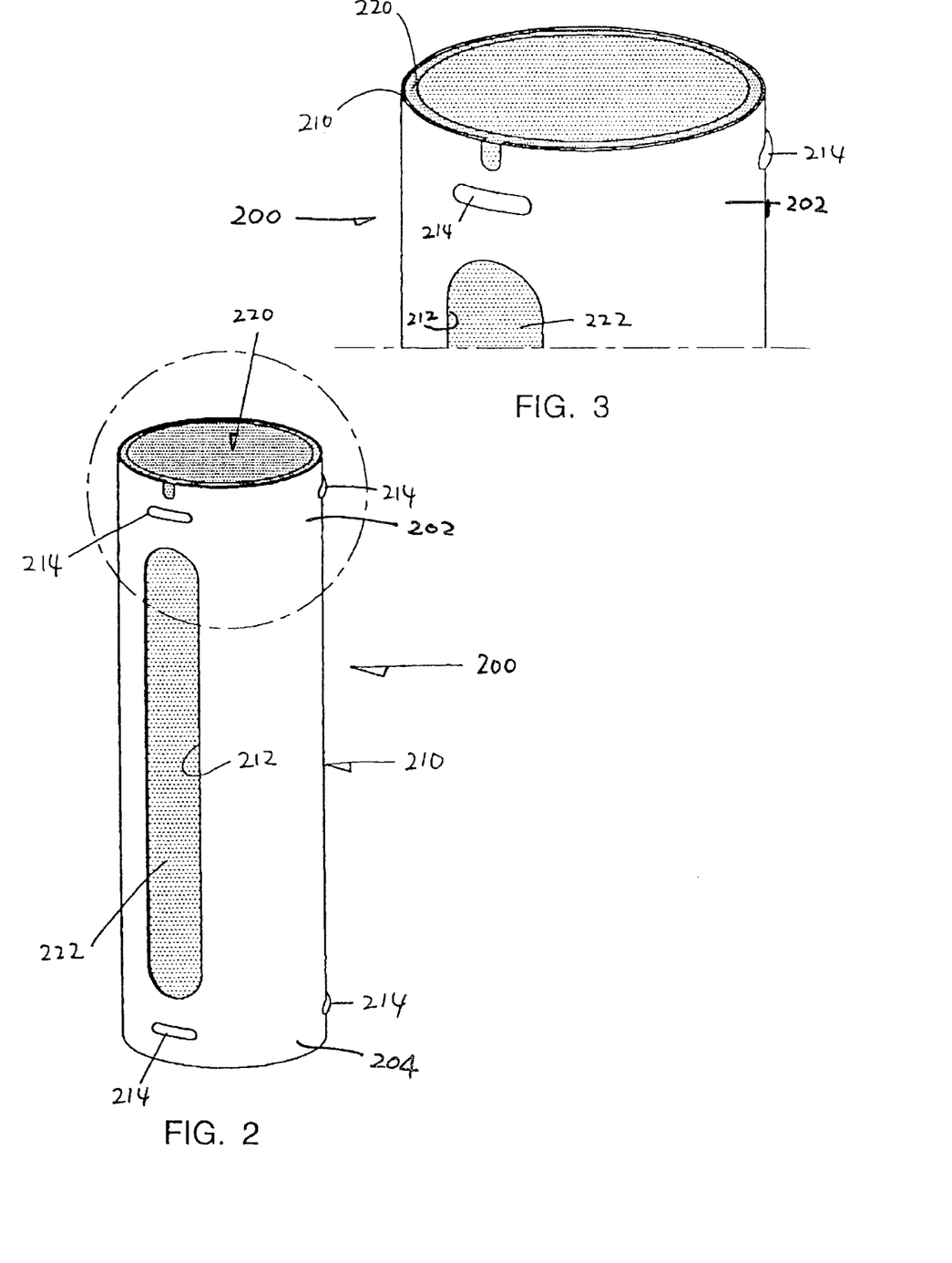
FIG. 2 is a front perspective view of the barrel of FIG. 1.
FIG. 3 is an enlarged perspective view corresponding to FIG. 2, showing an upper end of the barrel.
Figure 4:
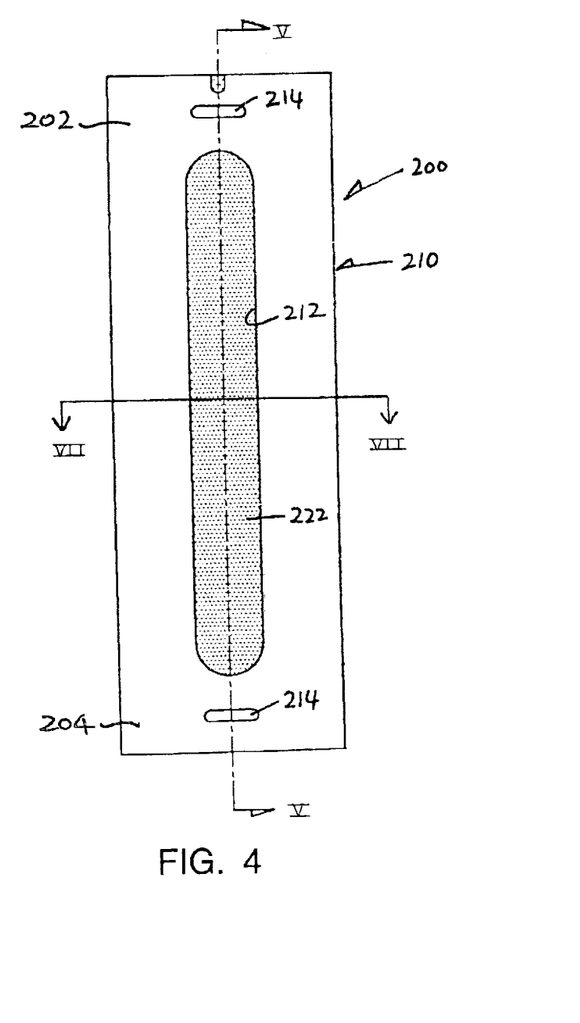
FIG. 4 is a front elevational view of the barrel of FIG. 2.
Figure 5:
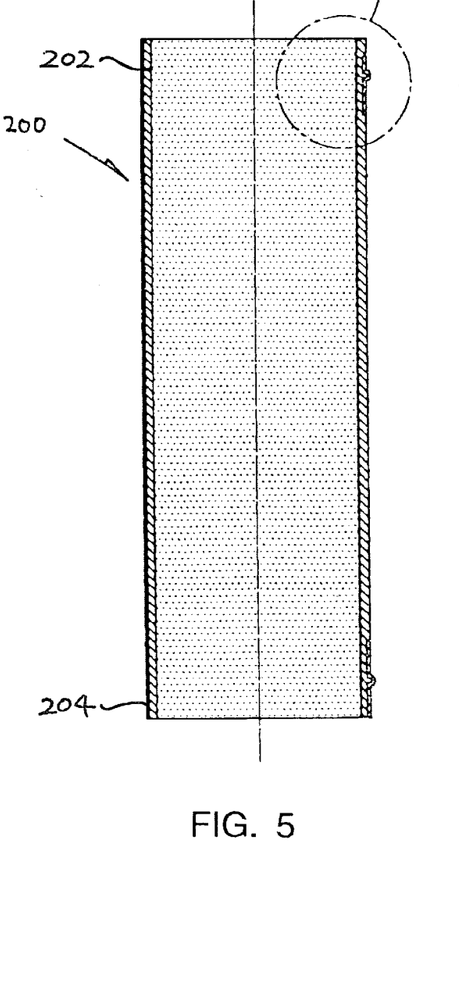
FIG. 5 is a cross-sectional side view of the barrel of FIG. 4, taken along line V—V.
Figure 6:
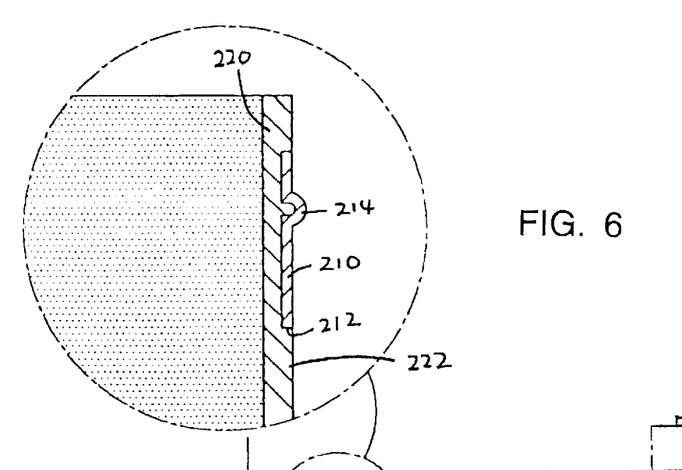
FIG. 6 is an enlarged cross-sectional view corresponding to FIG. 5, showing an upper end of the barrel.
Figure 7:
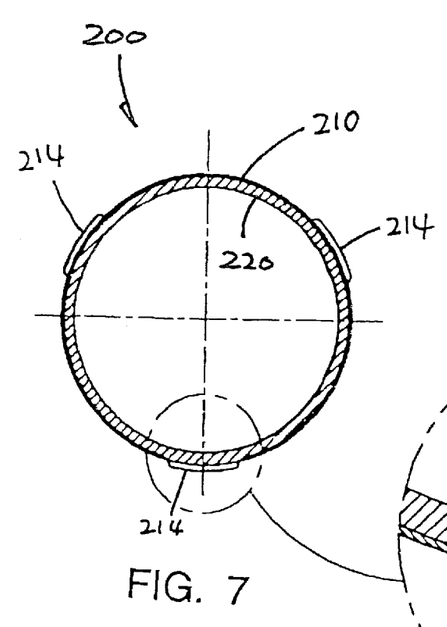
FIG. 7 is a cross-sectional end view of the barrel of FIG. 4, taken along line VII—VII.
Figure 8:
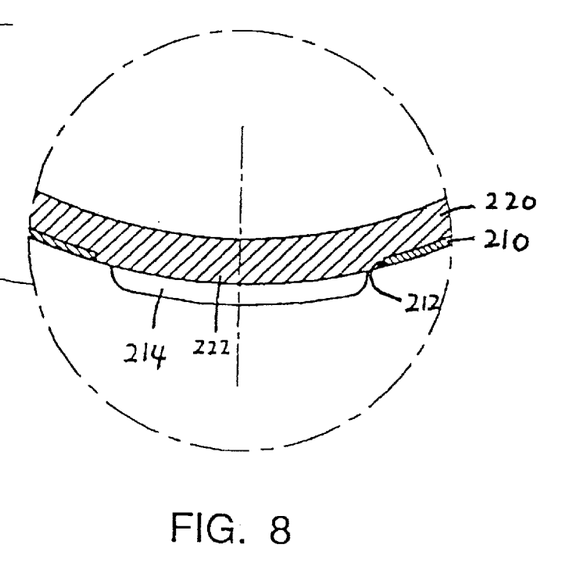
FIG. 8 is an enlarged cross-sectional view corresponding to FIG. 7, showing a front part of the barrel.
Figure 9:
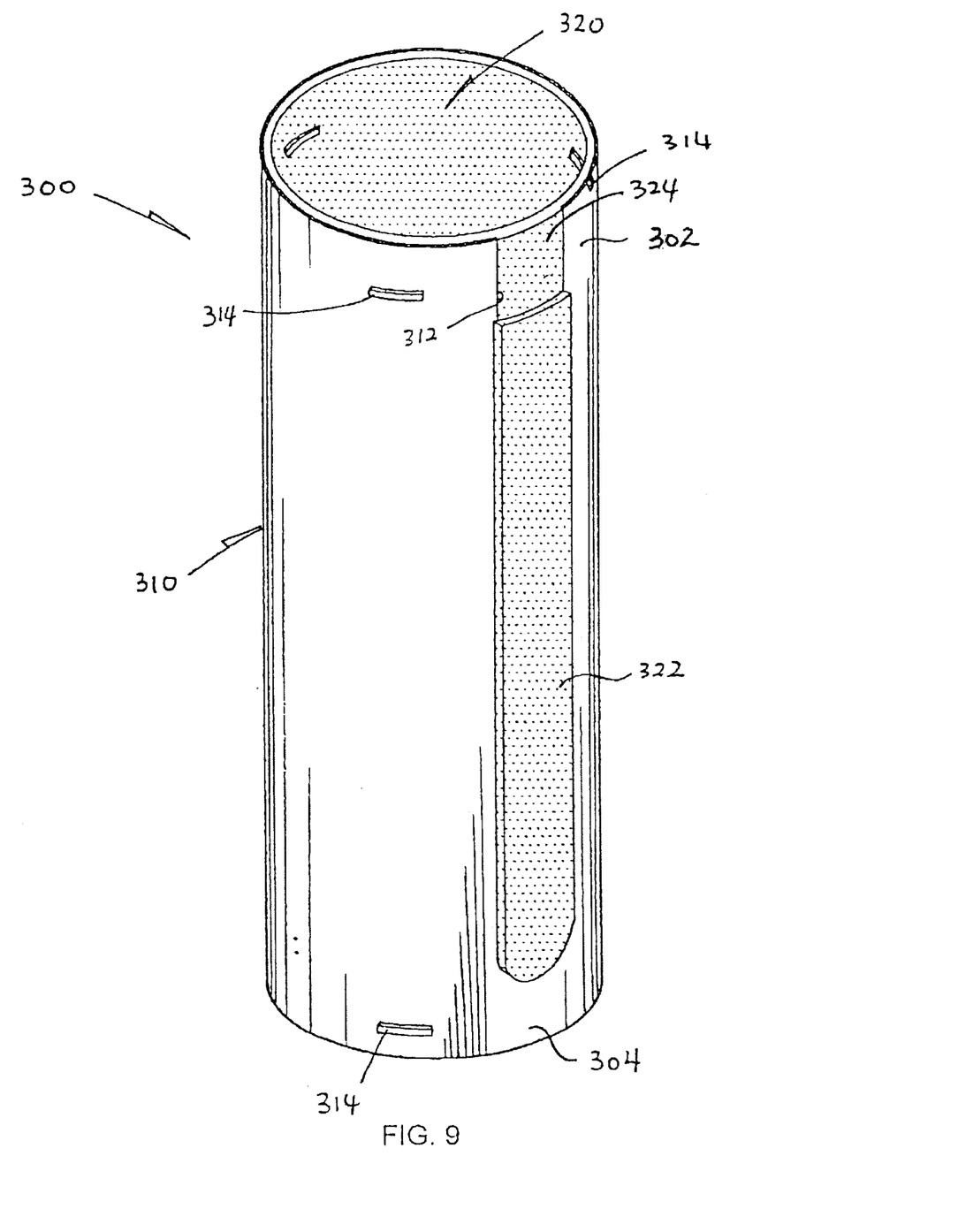
FIG. 9 is a front perspective view of an alternative cylindrical barrel that the cookie dough dispenser of FIG. 1 may incorporate.
Figure 10A:
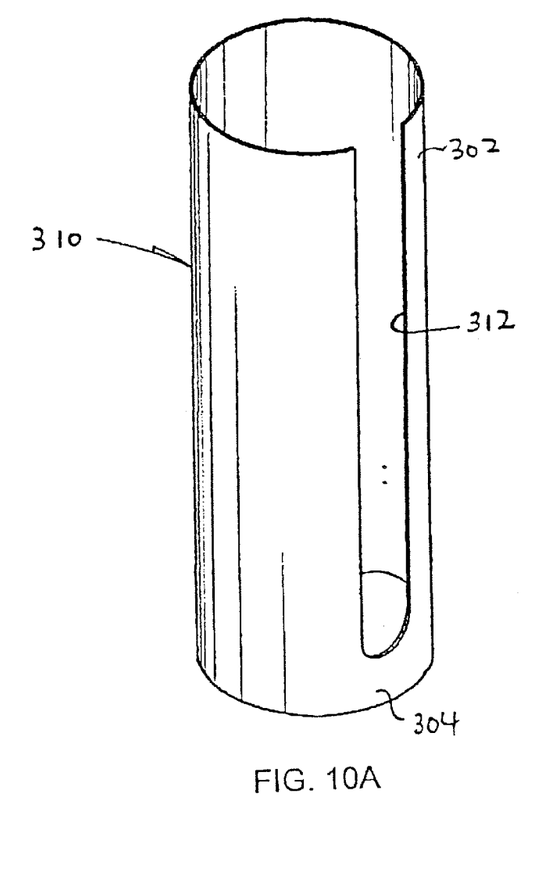
FIGS. 10A and 10B are perspective views corresponding to FIG. 9, showing outer and inner parts of the barrel, respectively, that are separated.
Figure 10B:
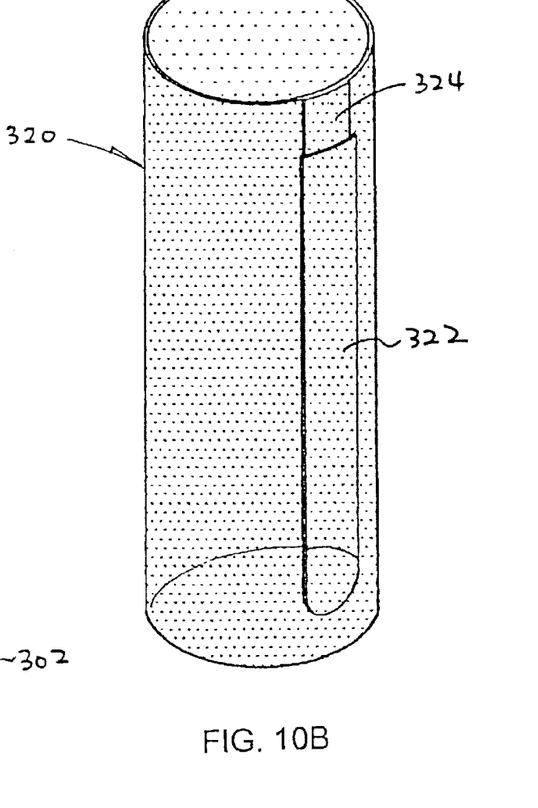
Figure 10C:
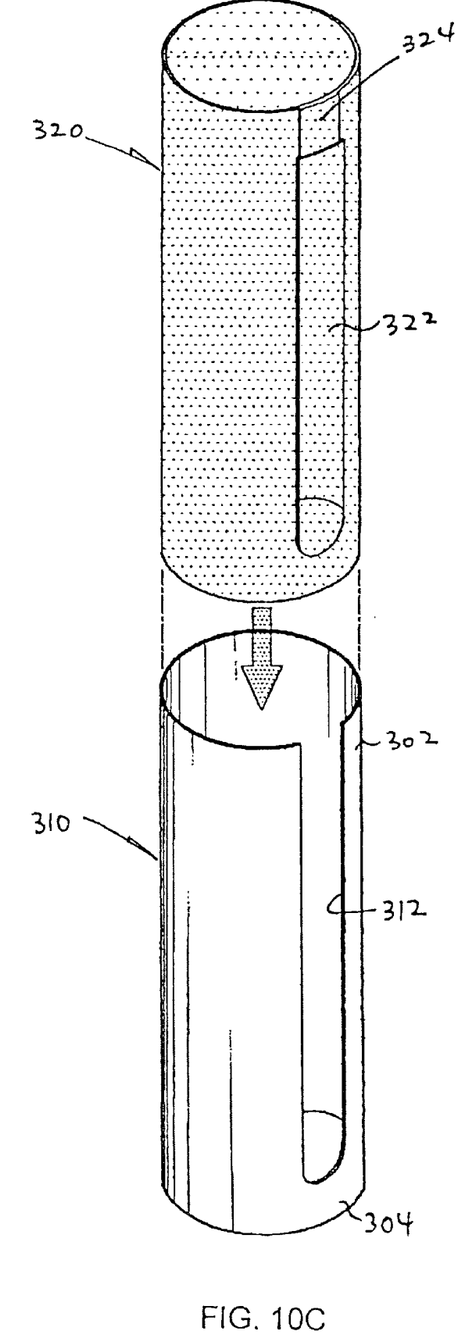
FIGS. 10C and 10D are perspective views corresponding to FIGS. 10A and 10B, showing how the outer and inner parts of the barrel are assembled.
Figure 10D:
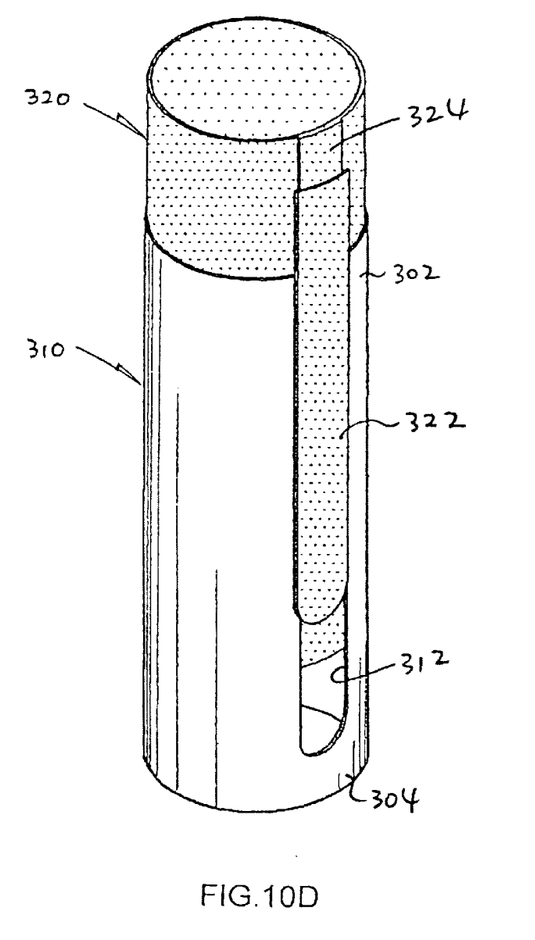
Figure 11:
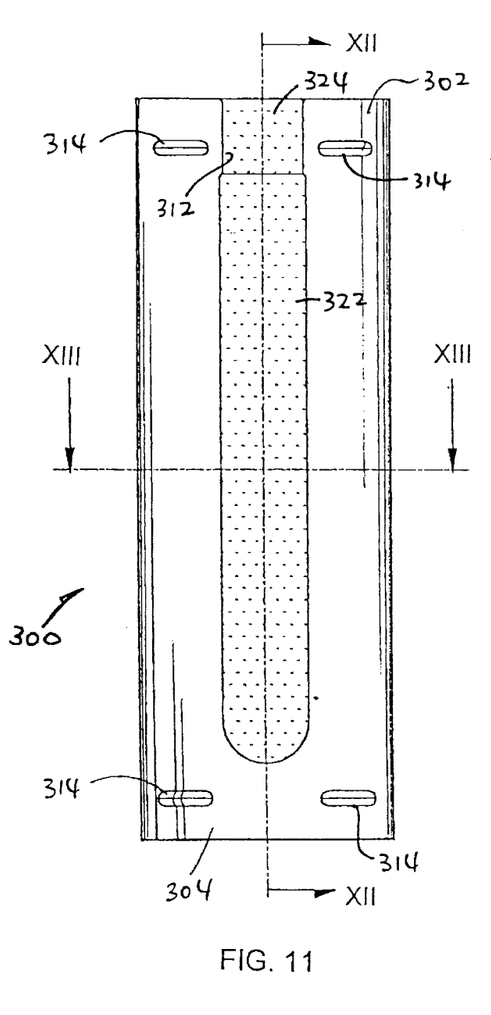
FIG. 11 is a front elevational view of the barrel of FIG. 9.
Figure 12:
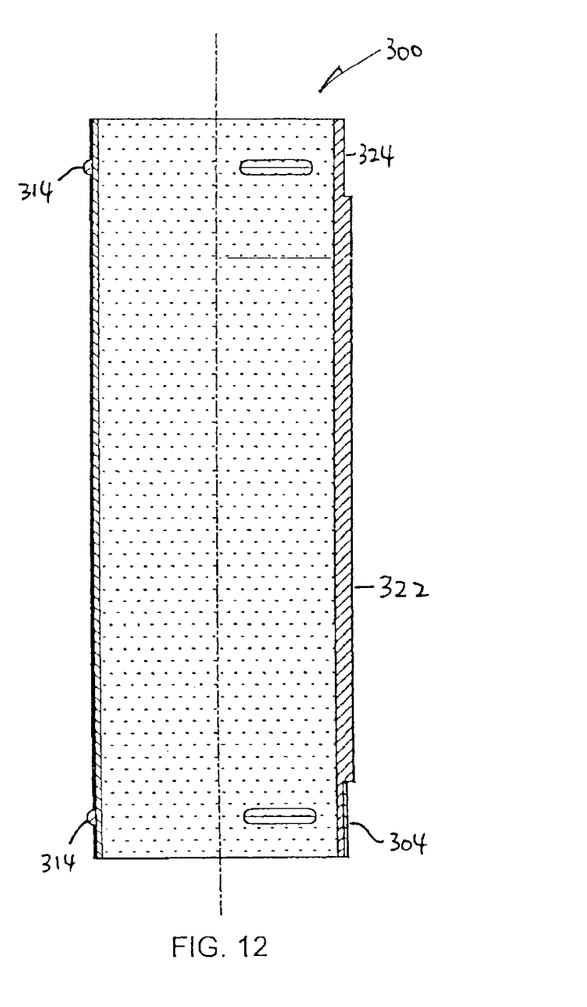
FIG. 12 is a cross-sectional side view of the barrel of FIG. 11, taken along line XII—XII.
Figure 13:
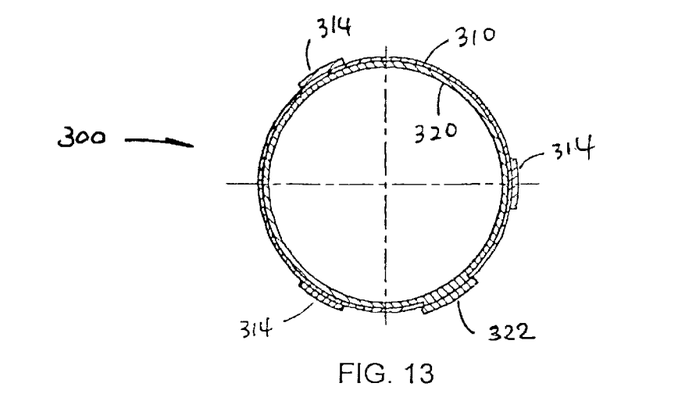
FIG. 13 is a cross-sectional top plan view of the barrel of FIG. 11, taken along line XIII—XIII.

Turning back to the first barrel 200, it is clear that the lens 222 may be moulded to have generally the same structure as the second lens 322, i.e. expanding outwards beyond the outer surface of the slot 212 and then laterally to form a periphery that, in this case, covers the entire rim of the slot 212. Such a slot 212 embraces the rim of the slot 212 in a snug manner in order to avoid or minimise the ingress of liquid through the junction between the lens 222 and the slot 212 into the interface between the two cylinders 210 and 220.

The barrel 200/300 of the subject invention is robust because it is made of metal on the outside i.e. the stainless steel outer cylinder 210/310, and is elegant in appearance. The window, i.e. the slot 212/312 and lens 222/322, is inherently leak-proof because the lens 222/322 is an integral part of the plastics inner cylinder 220/320, which preferably forms the entire inner surface of the barrel 200/300.

The invention has been given by way of example only, and various other modifications of and/or alterations to the described embodiments may be made by persons skilled in the art without departing from the scope of the invention as specified in the appended claims.

What is claimed is:

1. A cookie dough dispenser comprising:
   a barrel having opposite first and second ends for containing cookie dough,
   a handle provided at the first end,
   an exit at the second end for dispensing cookie dough contained in the barrel, and
   a cookie dough dispensing mechanism including
      an operating member at the handle and
      a piston slidable within and along an axis of the barrel to dispense cookie dough from the barrel through the exit, wherein the barrel includes an outer metal cylinder and an inner plastic cylinder that is transparent or near-transparent and located co-axially within the outer cylinder, the outer cylinder including a slot closed by an adjacent integral part of the inner cylinder and acting as a lens through which the piston is visible, wherein the lens expands in thickness outwards and occupies substantially all of the slot.

2. The cookie dough dispenser as claimed in claim 1, wherein the inner cylinder covers substantially all of an inner surface of the outer cylinder.

3. The cookie dough dispenser as claimed in claim 1, wherein the lens is flush with the slot on the outer surface of the outer cylinder.

4. The cookie dough dispenser as claimed in claim 1, wherein the lens expands outwards beyond an outer surface of the slot and laterally as a periphery that covers a substantial part of a rim of the slot, the lens, along the periphery engaging part of the rim.

5. The cookie dough dispenser as claimed in claim 1, wherein the handle is a pistol handgrip and the operating member comprises a trigger.

6. The cookie dough dispenser as claimed in claim 1, wherein the dispensing mechanism includes a ratchet rack having one end supporting the piston for sliding along the barrel and a ratchet member operable by the operating member to advance the rack and the piston, stepwise, to dispense cookie dough.

7. A cookie dough dispenser comprising:
   a barrel having opposite first and second ends for containing cookie dough,
   a handle provided at the first end,
   an exit at the second end for dispensing cookie dough contained in the barrel, and
   a cookie dough dispensing mechanism including
      an operating member at the handle and
      a piston slidable within and along an axis of the barrel to dispense cookie dough from the barrel through the exit, wherein the barrel includes an outer metal cylinder and an inner plastic cylinder that is transparent or near-transparent and located co-axially within and moulded onto the outer cylinder, the outer cylinder including a slot closed by an adjacent integral part of the inner cylinder and acting as a lens through which the piston is visible.

8. The cookie dough dispenser as claimed in claim 7, wherein the slot has opposite closed ends.

9. The cookie dough dispenser as claimed in claim 7, wherein adjacent the first end of the barrel, the outer cylinder is deformed outwards at equiangular protrusions providing screw threads for connecting the handle, the protrusions having, on a reverse side, indentations which the inner cylinder engages.

10. The cookie dough dispenser as claimed in claim 7, wherein adjacent the second end of the barrel, the outer cylinder is deformed outwards at equiangular protrusions providing screw threads for connecting a member forming the exit, the protrusions having, on a reverse side, indentations which the inner cylinder engages.

11. A cookie dough dispenser comprising:
   a barrel having opposite first and second ends for containing cookie dough,
   a handle provided at the first end,
   an exit at the second end for dispensing cookie dough contained in the barrel, and
   a cookie dough dispensing mechanism including
      an operating member at the handle and
      a piston slidable within and along an axis of the barrel to dispense cookie dough from the barrel through the exit, wherein the barrel includes an outer metal cylinder and an inner plastic cylinder that is transparent or near-transparent, and moulded into shape independently and then subsequently inserted co-axially into the outer cylinder as a sliding sung fit, the outer cylinder including a slot having an open end and an opposite closed end which is closed by an adjacent integral part of the inner cylinder and acts as a lens through which the piston is visible.

12. The cookie dough dispenser as claimed in claim 11, wherein adjacent the first end of the barrel, the outer cylinder is deformed slightly outwards at equiangular protrusions providing screw threads for connecting the handle.

13. The cookie dough dispenser as claimed in claim 11, wherein adjacent the first end of the barrel, the outer cylinder is deformed slightly outwards at equiangular protrusions providing screw threads for connecting a member forming the exit.

* * * * *